US008559979B2

(12) United States Patent
Gonzales et al.

(10) Patent No.: US 8,559,979 B2
(45) Date of Patent: Oct. 15, 2013

(54) MOBILE TERMINAL, LOCATION-BASED SERVICE SERVER, AND INFORMATION PROVIDING SYSTEM

(75) Inventors: Agape J. Gonzales, Kanagawa (JP); Johan Nielsen, Tokyo (JP)

(73) Assignees: Sony Corporation, Tokyo (JP); Sony Mobile Communications Inc., Tokyo (JP)

( * ) Notice: Subject to any disclaimer, the term of this patent is extended or adjusted under 35 U.S.C. 154(b) by 494 days.

(21) Appl. No.: 12/896,401

(22) Filed: Oct. 1, 2010

(65) Prior Publication Data

US 2011/0241882 A1 Oct. 6, 2011

Related U.S. Application Data

(60) Provisional application No. 61/319,966, filed on Apr. 1, 2010.

(51) Int. Cl.
*H04W 24/00* (2009.01)
(52) U.S. Cl.
USPC ...................................................... 455/456.3
(58) Field of Classification Search
USPC ............ 455/456.3, 456.1, 106, 130, 3.01, 91, 455/95.1, 100, 103, 104, 557, 466, 556, 455/359, 559, 418; 340/572.1
See application file for complete search history.

(56) References Cited

U.S. PATENT DOCUMENTS

| 5,794,160 | A * | 8/1998 | Ezuriko ........................ 455/557 |
| 6,934,540 | B2 * | 8/2005 | Twitchell, Jr. ............. 455/422.1 |
| 7,962,361 | B2 * | 6/2011 | Ramchandani et al. ... 705/14.25 |
| 7,966,003 | B2 * | 6/2011 | Longe et al. ............... 455/414.1 |
| 8,027,668 | B2 * | 9/2011 | Behzad et al. ............. 455/414.3 |
| 8,098,250 | B2 * | 1/2012 | Clegg et al. ................. 345/469.1 |
| 8,170,583 | B2 * | 5/2012 | Shkedi ........................ 455/456.1 |
| 8,175,258 | B2 * | 5/2012 | Rodenbusch et al. .... 379/266.07 |
| 8,244,236 | B2 * | 8/2012 | Roumeliotis et al. ......... 455/424 |
| 8,280,366 | B2 * | 10/2012 | Hirano et al. .............. 455/422.1 |
| 8,384,522 | B2 * | 2/2013 | Macauley et al. ............ 340/10.1 |
| 2002/0164995 | A1 * | 11/2002 | Brown et al. .................. 455/456 |
| 2002/0168985 | A1 * | 11/2002 | Zhao et al. .................... 455/456 |
| 2004/0225654 | A1 * | 11/2004 | Banavar et al. ................... 707/6 |
| 2009/0227271 | A1 * | 9/2009 | Lee ............................. 455/456.6 |

OTHER PUBLICATIONS

"Location Based Services", Verizon Developer Community, http://www.vzwdevelopers.com/aims/public/menu/lbs/LBSFAQ.jsp, 2010, pp. 1-2.
"Geodelic Systems Tapped by T-Mobile to Develop Intelligent Local Discovery Sherpa Application for MyTouch", Geodelic Systems, Jun. 22, 2009, pp. 1-2.
Geodelic to Offer Intelligent Local Discovery Application—Sherpa—for T-Moblie(R) myTouch(TM) 3G with Google(TM), 2008, SYS-CON Media Inc., pp. 1-2.

* cited by examiner

*Primary Examiner* — Melody Mehrpour
(74) *Attorney, Agent, or Firm* — Oblon, Spivak, McClelland, Maier & Neustadt, L.L.P.

(57) ABSTRACT

A mobile terminal including a position detection unit that detects a current position of the mobile terminal; a communication interface that transmits the detected current position to a server, and receives, from the server, a plurality of tags corresponding to services provided in an area surrounding the current position of the mobile terminal; a status detection unit that detects a current status of the mobile terminal; a tag determination unit that determines a tag corresponding to the current status of the mobile terminal; a tag comparison unit that determines at least one recommended service by comparing the tag corresponding to the current status of the mobile terminal with each of the plurality of tags corresponding to services provided in an area surrounding the current position of the mobile terminal; and
a display that displays information corresponding to the at least one recommended service determined by the tag comparison unit.

17 Claims, 17 Drawing Sheets

| | |
|---|---|
| SERVICE NAME | |
| TAG | |
| ADDRESS | |
| PHONE NUMBER | |
| NECESSITY OF GOING TO SHOP | |
| BUSINESS HOURS | |
| WEB ADDRESS (URL) | |
| GPS COORDINATES (POSITION) | |
| ⋮ | ⋮ |

FIG. 4A

| SERVICE NAME | TSUYOI SPORTS GOODS |
|---|---|
| TAG | SPORTS, BASEBALL, SOCCER |
| ADDRESS | ... Minato-ku, Tokyo |
| PHONE NUMBER | xxx-111-1234 |
| NECESSITY OF GOING TO SHOP | NECESSARY |
| BUSINESS HOURS | 8:00 - 20:00 |
| WEB ADDRESS (URL) | NONE |
| GPS COORDINATES (POSITION) | NORTH LATITUDE: 36.3636 EAST LONGITUDE: 140.4444 |
| ⋮ | ⋮ |

FIG. 4B

| SERVICE NAME | PUNCH SPORTS ONLINE |
|---|---|
| TAG | SPORTS, BOXING, KARATE |
| ADDRESS | ... Sapporo-shi, Hokkaido |
| PHONE NUMBER | xxx-111-1234 |
| NECESSITY OF GOING TO SHOP | UNNECESSARY |
| BUSINESS HOURS | 24 HOUR BUSINESS |
| WEB ADDRESS (URL) | Http://starstar.co.jp |
| GPS COORDINATES (POSITION) | NORTH LATITUDE: 43.4343 EAST LONGITUDE: 142.2222 |
| ⋮ | ⋮ |

FIG. 4C

| SERVICE NAME | HAYAI CONVENIENCE STORE |
|---|---|
| TAG | CONVENIENCE STORE |
| ADDRESS | ... Yokohama-shi, Kanagawa-ken |
| PHONE NUMBER | xxx-222-9876 |
| NECESSITY OF GOING TO SHOP | NECESSARY |
| BUSINESS HOURS | 24 HOUR BUSINESS |
| WEB ADDRESS (URL) | NONE |
| GPS COORDINATES (POSITION) | NORTH LATITUDE: 35.8888 EAST LONGITUDE: 139.9999 |
| ⋮ | ⋮ |

FIG. 4D

| SERVICE NAME | MARINE SPORTS |
|---|---|
| TAG | SPORTS, DIVING, SURFING |
| ADDRESS | ... Naha-shi, Okinawa-ken |
| PHONE NUMBER | xxx-111-1234 |
| NECESSITY OF GOING TO SHOP | NECESSARY |
| BUSINESS HOURS | 11:00 - 19:00 |
| WEB ADDRESS (URL) | http://.umiumiumi.co.jp |
| GPS COORDINATES (POSITION) | NORTH LATITUDE: 27.2727 EAST LONGITUDE: 127.7777 |
| ⋮ | ⋮ |

FIG. 4E

| SERVICE NAME | MINA TANOSHII FOODS |
|---|---|
| TAG | FOODS |
| ADDRESS | ... Kobe-shi, Hyogo-ken |
| PHONE NUMBER | xxx-123-4567 |
| NECESSITY OF GOING TO SHOP | NECESSARY |
| BUSINESS HOURS | 10:00 - 21:00 |
| WEB ADDRESS (URL) | http://zakka-ooo.co.jp |
| GPS COORDINATES (POSITION) | NORTH LATITUDE: 34.3333 EAST LONGITUDE: 136.6666 |
| ⋮ | ⋮ |

FIG. 6

| TAG | NECESSITY OF GOING TO SHOP (NECESSARY) | NECESSITY OF GOING TO SHOP (UNNECESSARY) |
|---|---|---|
| TAG 1 | SERVICE NAME a | SERVICE NAME b |
| | SERVICE NAME b | SERVICE NAME d |
| | ⋮ | ⋮ |
| TAG 2 | SERVICE NAME g | SERVICE NAME h |
| | SERVICE NAME j | SERVICE NAME j |
| | ⋮ | ⋮ |
| ⋮ | ⋮ | ⋮ |

FIG. 7

| TAG | NECESSITY OF GOING TO SHOP (NECESSARY) | NECESSITY OF GOING TO SHOP (UNNECESSARY) |
|---|---|---|
| SPORTS | TSUYOI SPORTS GOODS (8:00 - 19:00) | PUNCH SPORTS ONLINE (24 HOUR BUSINESS) |
| | MARINE SPORTS (11:00 - 19:00) | |
| BASEBALL | TSUYOI SPORTS GOODS (11:00 - 19:00) | |
| SOCCER | TSUYOI SPORTS GOODS (11:00 - 19:00) | |
| BOXING | | PUNCH SPORTS ONLINE (24 HOUR BUSINESS) |
| KARATE | | PUNCH SPORTS ONLINE (24 HOUR BUSINESS) |
| DIVING | MARINE SPORTS (11:00 - 19:00) | |
| SURFING | MARINE SPORTS (11:00 - 19:00) | |
| CONVENIENCE STORE | HAYAI CONVENIENCE STORE (24 HOUR BUSINESS) | |
| FOODS | MINNA TANOSHII FOODS (10:00 - 21:00) | |
| ⋮ | ⋮ | ⋮ |

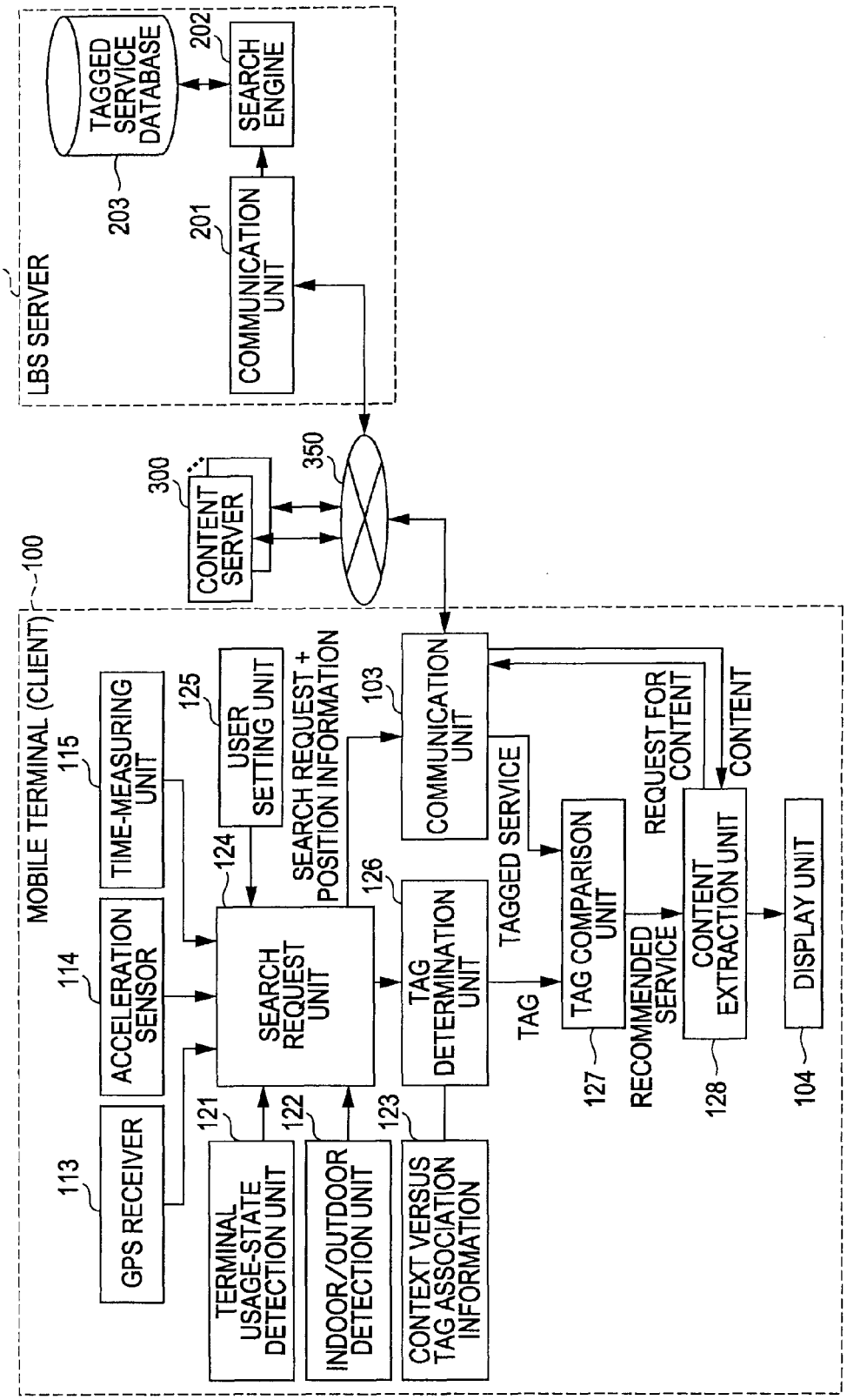

FIG. 10

| MOVEMENT STATE \ USAGE STATE | DURING CALLING | DURING CREATION OF MESSAGE | DURING MUSIC APPRECIATION | DURING WEB SURFING | ... |
|---|---|---|---|---|---|
| STILL STATE | | | | | |
| WALKING | | | | | |
| RUNNING (JOGGING) | | | | | |
| RIDING | | | | | |
| FLYING | | | | | |
| ⋮ | | | | | |

| | INDOORS | OUTDOORS |
|---|---|---|
| MORNING (6:00-9:00) | 1. NEWS + NEWSPAPER<br>2. NEWS + TV + STREAMING<br>⋮ | 1. COFFEE + RESTAURANT<br>  (GOING TO SHOP IS NECESSARY)<br>2. SUBWAY + TIMETABLE<br>3. NEWSPAPER + SHOPPING<br>  (GOING TO SHOP IS NECESSARY)<br>⋮ |
| DAYTIME (9:00-19:00) | 1. MUSIC + SHOPPING<br>2. MUSIC + VIDEO<br>  + STREAMING<br>⋮ | 1. MUSIC + SHOPPING<br>2. MUSIC + RESTAURANT<br>  (GOING TO SHOP IS NECESSARY)<br>3. MUSIC + VIDEO + STREAMING<br>⋮ |
| NIGHT (19:00-23:00) | 1. MUSIC + SHOPPING<br>2. MUSIC + VIDEO<br>  + STREAMING<br>⋮ | 1. CONVENIENCE STORE<br>  (GOING TO SHOP IS NECESSARY)<br>2. FOODS STORE<br>  (GOING TO SHOP IS NECESSARY)<br>⋮ |
| LATE NIGHT (23:00-6:00) | 1. MUSIC + VIDEO<br>  + STREAMING<br>2. RADIO + STREAMING<br>3. MOVIE + STREAMING<br>⋮ | 1. MUSIC BAR<br>  (GOING TO SHOP IS NECESSARY)<br>2. DRUGSTORE + SHOPPING<br>⋮ |

FIG. 12

| USAGE STATE / MOVEMENT STATE | DURING CALLING | DURING CREATION OF MESSAGE | DURING MUSIC APPRECIATION | DURING WEB SURFING | ... |
|---|---|---|---|---|---|
| STILL STATE | | | | | |
| WALKING | | | | | |
| RUNNING (JOGGING) | | | | | |
| RIDING | | | | | |
| FLYING | | | | | |
| ⋮ | | | | | |

123

| | INDOORS | OUTDOORS |
|---|---|---|
| MORNING (6:00-9:00) | | 1. COFFEE + RESTAURANT (GOING TO SHOP IS NECESSARY)<br>2. CONVENIENCE STORE (GOING TO SHOP IS NECESSARY)<br>3. NEWSPAPER + SHOPPING (GOING TO SHOP IS NECESSARY)<br>⋮ |
| DAYTIME (9:00-19:00) | | 1. CONVENIENCE STORE (GOING TO SHOP IS NECESSARY)<br>2. MUSIC + RESTAURANT (GOING TO SHOP IS NECESSARY)<br>3. MUSIC + SHOPPING<br>⋮ |
| NIGHT (19:00-23:00) | | 1. CONVENIENCE STORE (GOING TO SHOP IS NECESSARY)<br>2. FOODS STORE (GOING TO SHOP IS NECESSARY)<br>⋮ |
| LATE NIGHT (23:00-6:00) | | 1. CONVENIENCE STORE (GOING TO SHOP IS NECESSARY)<br>2. DRUGSTORE + SHOPPING<br>⋮ |

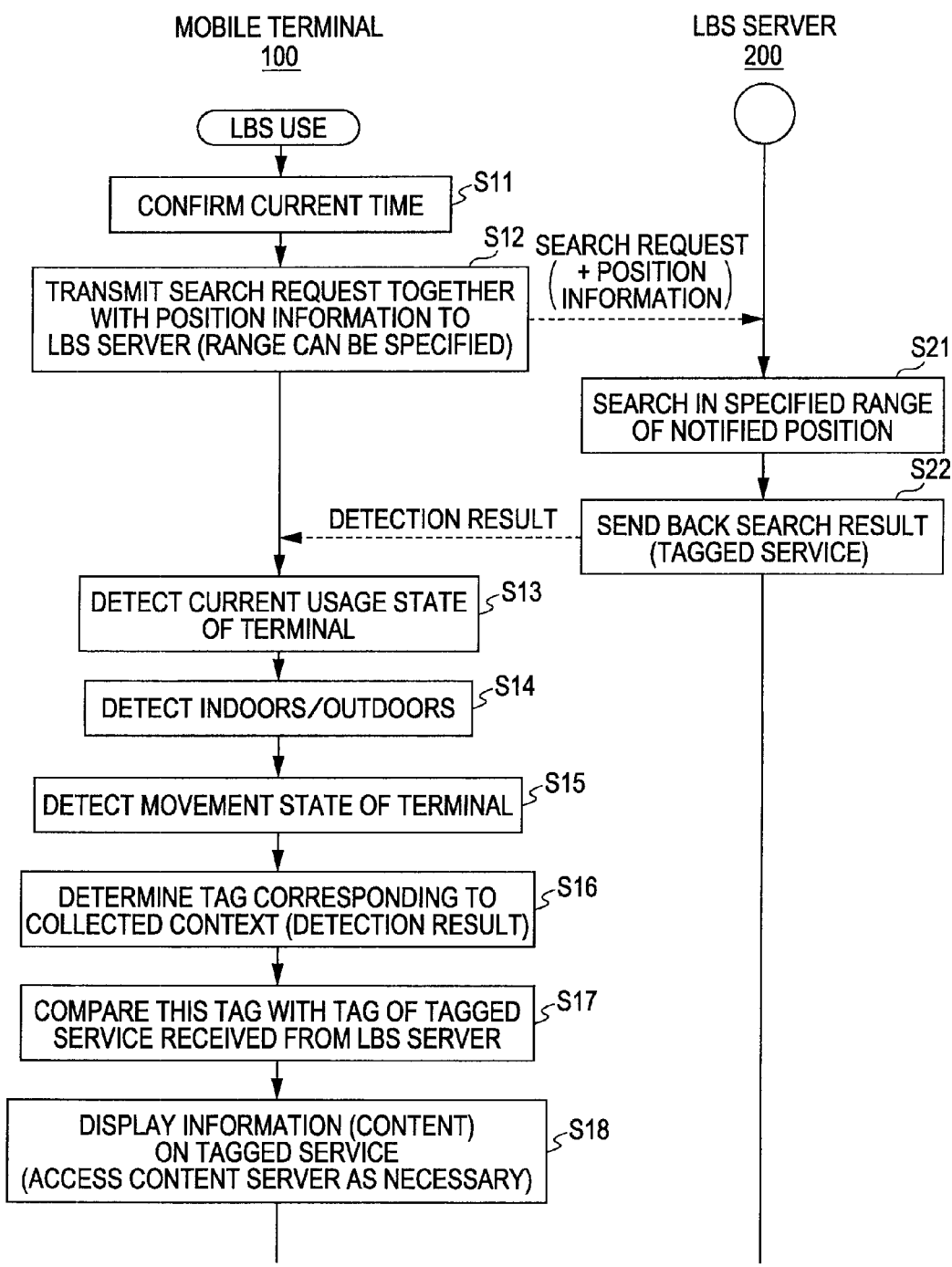

MOBILE TERMINAL, LOCATION-BASED SERVICE SERVER, AND INFORMATION PROVIDING SYSTEM

CROSS REFERENCE TO RELATED APPLICATION

This application claims the benefit of priority of Provisional Application Ser. No. 61/319,966, filed Apr. 1, 2010, the entire contents of which is incorporated herein by reference.

BACKGROUND OF THE INVENTION

1. Field of the Invention

The present invention relates to an information providing system that provides information about location-based services, a mobile terminal, and a location-based service server.

2. Description of the Related Art

In recent years, it has become possible for mobile terminals, such as mobile phones with greater functionality, to use various services.

For example, location-based services (LBSs), in which a position is used as a reference, are usually information services that can be used by accessing a communication network by using a position detection function possessed by a mobile terminal.

Location-based service information is normally obtained on the basis of the current situation of a mobile terminal. The most commonly used situation information is position. When a mobile terminal transmits position information to an LBS server (provider) by using a position detection application that detects the current position, the LBS server sends back information associated with such position to the mobile terminal.

Hitherto, Verizon Wireless Inc. has provided location-based services to service-compatible mobile phone terminals of the subscribers thereof. The information transmitted to the mobile terminals with these services is based on a position.

"Sherpa—'Geodelic's Intelligent Local Discovery Application for T-Mobile', describes an application for learning the position of a user (visited retail stores, restaurants, etc.) and preferences of the user over a long period of time. This application becomes better matched with the preferences of the user with increased usage of the mobile terminal. Wherever the user goes, it is possible for the application to recommend places matching his/her preferences.

U.S. Patent Application Publication No. 2004-0225654 describes a technology in which situation information, such as positions, features, and the like of a user are collected and learned, and services appropriate for the situation are provided to the user.

SUMMARY OF THE INVENTION

In the technology disclosed in "Sherpa—'Geodelic's Intelligent Local Discovery Application for T-Mobile', the range of information to be distributed tends to be too wide for a user, and this is inconvenient for the user. It is possible for the user to customize the setting of a terminal so as to narrow the search result. However, the operation is not easy when, in particular, the user is moving (for example, walking on the street, or jogging in a park).

In the technique involving learning disclosed in "Sherpa—'Geodelic's Intelligent Local Discovery Application for T-Mobile', and in U.S. Patent Application Publication No. 2004-0225654, recommended information that is initially presented by such an application is not necessarily appropriate for such a user. Furthermore, if it is assumed that all the user information is stored in the memory of the mobile terminal by the application, the memory readily becomes full when a device for using the application is frequently used for a long period of time. In order to create an available area in the memory, information in the memory should be deleted. In that case, the capability with which the device provides customized information to the user is deteriorated.

Furthermore, the main body of situation information to be learned is composed of static positions, and the selection of the information corresponding to the situation is therefore approximate.

It is desirable to provide information about location-based services to a user on the basis of the situation including the position information of a mobile terminal, and at least one of the movement speed and the usage state of the mobile terminal rather than on the basis of past data and learned information.

According to an embodiment of the present invention, mobile terminal includes a position detection unit that detects a current position of the mobile terminal; a communication interface that transmits the detected current position to a server, and receives, from the server, a plurality of tags corresponding to services provided in an area surrounding the current position of the mobile terminal; a status detection unit that detects a current status of the mobile terminal; a tag determination unit configured that determines a tag corresponding to the current status of the mobile terminal; a tag comparison unit that determines at least one recommended service by comparing the tag corresponding to the current status of the mobile terminal with each of the plurality of tags corresponding to services provided in an area surrounding the current position of the mobile terminal; and a display that displays information corresponding to the at least one recommended service determined by the tag comparison unit.

BRIEF DESCRIPTION OF THE DRAWINGS

FIG. 3 illustrates an example of content of shop data regarding each service registered in a tagged service database inside an LBS server in an embodiment of the present invention;

FIGS. 4A, 4B, 4C, 4D, and 4E illustrate examples of specific registrations of shop data according to an embodiment of the present invention;

FIG. 6 illustrates services belonging to a common tag, which are further classified on the basis of "necessary" or "unnecessary" of "necessity of going to shop" according to an embodiment of the present invention;

FIG. 7 illustrates examples of shops shown in FIG. 4, which are adapted to examples of specific tags;

FIG. 8 illustrates a modification of the system of FIG. 1;

FIG. 10 illustrates a specific example of context versus tag association information in the mobile terminal shown in FIG. 1 or FIG. 8;

FIG. 12 illustrates another example of the specific context versus tag association information in the mobile terminal shown in FIG. 1 or FIG. 8;

FIG. 13 is a flowchart illustrating an example of the processing of a mobile terminal and an LBS server in the information providing system according to an embodiment of the present invention;

DESCRIPTION OF THE PREFERRED EMBODIMENTS

Preferred embodiments of the present invention will be described below in detail with reference to the drawings.

Figure 1:
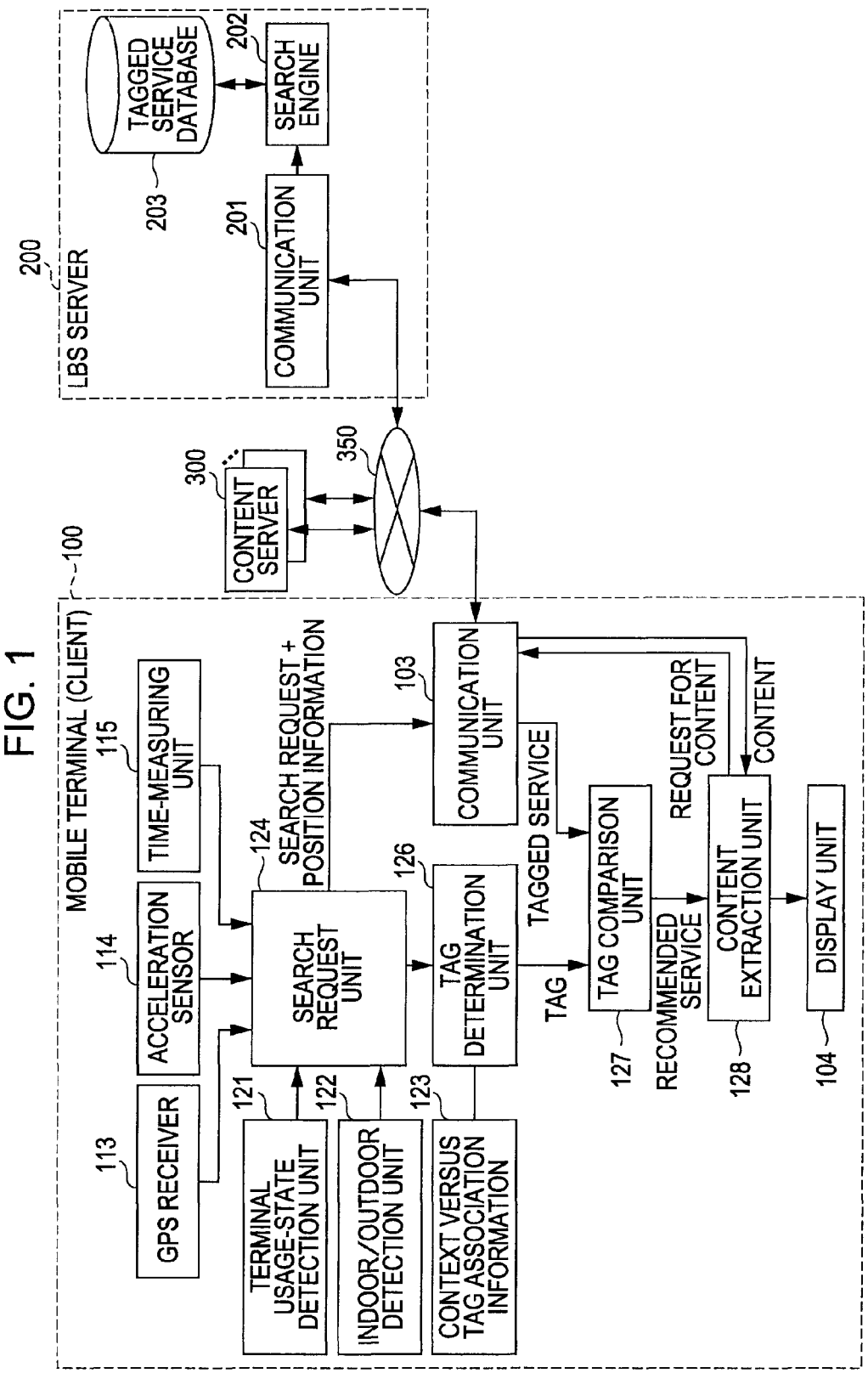
FIG. 1 illustrates an example of the configuration of the entire information providing system according to an embodiment of the present invention.

FIG. 1 illustrates an example of the overall configuration of an information providing system in the present embodiment. FIG. 1 is a function block diagram illustrating the function of each of units.

In the information providing system, a mobile terminal 100 serving as a client and a location-based service server (LBS server) 200 are connected to each other via a communication network 350. The communication network includes a mobile phone network and the Internet.

The LBS server 200 is a search server that provides services that can be used by the mobile terminal 100 via the communication network 350. Services registered in the LBS server 200 are attached with tags (tags serving as classification information of services) for identifying the category to which the service belongs. A tag is associated with a situation (that is, context) containing at least one of the movement speed and the usage state of each mobile terminal 100.

The LBS server 200 includes a tagged service database 203, a search engine 202, and a communication unit 201. The tagged service database 203 is a database in which tagged services associated with map information are stored as location-based services in such a manner as to be searched for. In the present embodiment, the tagged services registered in advance in the database 203 are typically shops (including facilities or the like) that provide services to a user of a mobile terminal. Therefore, the term "service" in the present specification, in a narrow sense, refers to a business that provides products and services, and in a wide sense, refers to a shop, a facility, or the like, which provides the services (narrow sense).

For a certain shop, in a case where a plurality of services (narrow sense) are to be provided, the same shop may be attached with a plurality of tags. A Web site on the Internet, which provides specific services (narrow sense), can also be registered in the LBS server.

The search engine 202 searches for tagged services provided in an area in the surroundings of a given position. The search engine 202 may correspond to one example of a means for searching at the LBS server. The communication unit 201 is a communication interface that receives, from the mobile terminal, a search request together with the current position information via a communication network, and transmits, to the mobile terminal via the communication network, tagged services obtained as a result of the search performed by the search engine 202 in response to the received search request. The communication unit 202 may correspond to one example of a means for transmitting or a means for receiving at the LBS server.

Furthermore, in the present embodiment, geographic information that can be obtained from a map-related service is used. Such geographic information is data for identifying services in the neighborhood of the user, which are useful for the user. Such geographic information is provided in the LBS server 200 and used, or is used in cooperation with an external map-related service.

Such a map-related service is provided by a map search application (for example, Google Maps provided by Google Inc.) by which neighboring facilities and the like can be viewed. In order to determine the range of the area to be searched for, a default distance from the current position of the user is set. As will be described later, this distance may be set in such a manner that it can be variably set by the mobile terminal user.

The LBS server 200 updates the content of the tagged service database 203 as appropriate. This updating includes addition of a new service (shop), deletion thereof, change of content, and the like.

As the mobile terminal 100 in the present embodiment, a portable telephone terminal is assumed, and is connected to the communication network 350 by the communication unit 103 that supports a wireless interface. The communication unit 103 may correspond to one example of a means for transmitting or a means for receiving at the mobile terminal 100. This mobile terminal 100 has various components for detecting various information.

Firstly, the mobile terminal 100 has a global positioning system (GPS) receiver 113 as one example of position detection means for detecting its current position (consequently the position of the user).

Secondly, the mobile terminal 100 has an acceleration sensor 114 as a movement sensor for detecting the movement (consequently the movement speed) of the mobile terminal 100. The acceleration sensor is one example of a component of a movement detection means of the mobile terminal 100.

Thirdly, the mobile terminal 100 has a time-measuring unit 115 for detecting time information, in particular, the current time. The time-measuring unit 115 can be constituted by, for example, a real time clock (RTC). The time-measuring unit is one example of a time measuring means of the mobile terminal 100.

Fourthly, the mobile terminal 100 has a terminal usage-state detection unit 121 for detecting a state in which the mobile terminal is being used, in particular, an application (for example, electronic mail function, Web browsing function, etc.) that is being currently used. The terminal usage-state detection unit 121 is one example of a means for detecting terminal-usage state at the mobile terminal 100.

Fifthly, the mobile terminal 100 has an indoor/outdoor detection unit 122 for detecting whether the mobile terminal 100 is indoors or outdoors. The detection of whether the mobile terminal 100 is indoors or outdoors by the indoor/outdoor detection unit 122 can be determined in accordance with whether or not the GPS coordinates are inside a building area on a map in a case where the GPS coordinates and map data of comparatively high accuracy can be used. Alternatively, a determination can also be made on the basis of the reception sensitivity of an antenna of the mobile terminal. For example, if the reception sensitivity is lower than or equal to a predetermined level, it can be determined that the mobile terminal user is indoors. Furthermore, the output of the movement sensor may be referred to. For example, on the basis of the output of the movement sensor, if the movement speed of the mobile terminal is higher than or equal to a predetermined level, it is possible to determine that the mobile terminal user is outdoors. The indoor/outdoor detection unit may be one example of a means for detecting whether the mobile terminal is indoors or outdoors at the mobile terminal 100.

The information detected by these various types of detection units is collected by a search request unit 124. The search request unit 124 issues a search request for services (in a wide sense or a narrow sense) cyclically (for example, every 30 seconds) or in response to an instruction of the user sporadically. This search request contains position information. The search request is transmitted to the LBS server 200 via the communication unit 103 through the communication network 350.

On the basis of the various detection results from the search request unit 124, a tag determination unit 126 refers to context versus tag association information 123, which in combination is one example of a situation versus tag association means, so as to determine a tag corresponding to the current context (that is, the current situation). In this example, the context includes information indicating the movement speed obtained from the acceleration sensor 114, the current time obtained from the time-measuring unit 115, the terminal usage state obtained from the terminal usage-state detector 121, and information regarding whether the terminal is indoors or outdoors obtained from the indoor/outdoor detection unit 122.

The context versus tag association information 123 is table information in which tags serving as service classification information are associated in advance with context that is determined by the combination of the above-described various detection results. This context versus tag association information 123 may be provided as a data table in a storage unit (to be described later), or may be stored in such a manner as to be included in a process program as a process determination condition.

The communication unit 103 receives, from the LBS server 200 that has performed a search for services on the basis of the current position of the mobile terminal 100 in response to the search request, tagged services as a search result of the services provided in the area in the surroundings of the current position. A tag comparison unit 127 extracts, as recommended services, tagged services corresponding to the tags relevant to the current situation among the received tagged services. In a case where the recommended services contain a Web address, such as a uniform resource locator (URL), for obtaining further information (content) associated with the service, a content extraction unit 128 outputs a request for the content to the communication network 250 via the communication unit 103. In response to this, content corresponding to the URL is obtained from the content server 300 and is displayed on the display unit 104. In a case where the recommended service does not have a URL, information on the recommended service itself is displayed on the display unit 104 without accessing the content server 300. The display unit 104 is one example of a recommended service display means in an embodiment of the present invention.

The context (situation information) of the mobile terminal used in the present embodiment is summarized as follows.
(1) Position Information The position at which the user is estimated to be can be determined by a device the determines the geographic position of the mobile terminal 100, such as the GPS receiver 113. This position information can be viewed as part of the context of the mobile terminal 100 in a wide sense. However, in the present embodiment, the position information is not contained in the context (situation information) for determining the tag in the tag determination unit 126, and is contained in the search request and is transmitted to the LBS server 200.
(2) Movement Sensor Data The physical state of the user can be determined by a movement sensor, such as an acceleration sensor. On the basis of the output of the movement sensor, a state, such as being still, walking, jogging, running, or flying (for example, being aboard an airplane), of the mobile terminal user can be detected.

That is, the movement speed of the mobile terminal, which is obtained on the basis of the output of the movement sensor, can be determined by making a determination using a predetermined threshold value.

Since the movement state in the present embodiment is determined strictly on the basis of the movement speed of the mobile terminal, even if the user walks or runs on an indoor running machine, the state is determined to be a state of being still.
(3) Time Period (Time)

This data is related to a time (time zone) at the time when a request for searching for location-based services is made to the LBS server.
(4) State in Which Terminal is Used This data is related to an application that is being currently performed in the terminal of the user.
(5) Indoor/Outdoor Data This is information indicating whether the terminal is indoors or outdoors, which is obtained from the indoor/outdoor detection unit 122.

Figure 2:
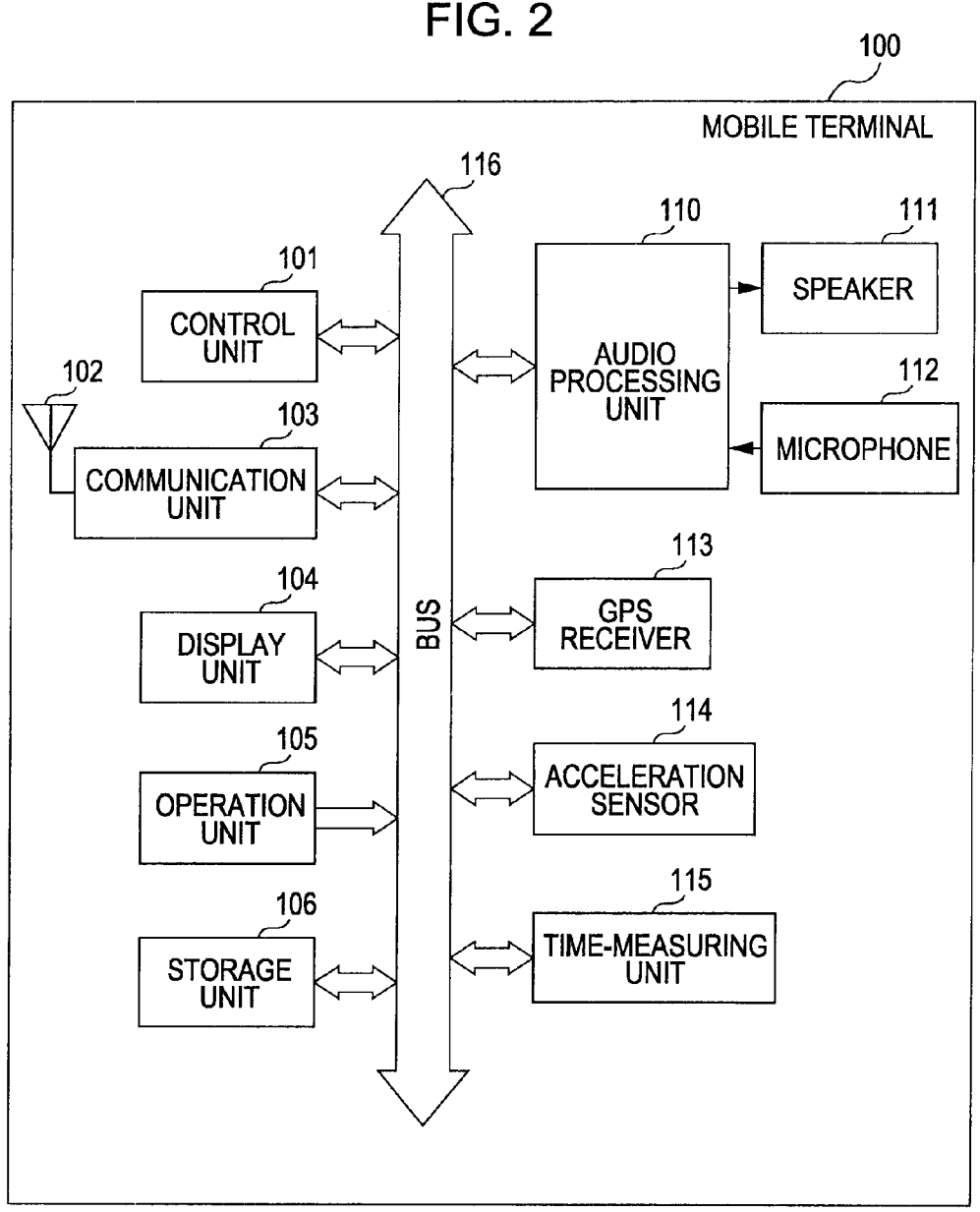
FIG. 2 illustrates an overall hardware configuration of a mobile terminal according to an embodiment of the present invention.

FIG. 2 illustrates an overall hardware configuration of the mobile terminal 100 according to the present embodiment.

The mobile terminal 100 includes a control unit 101, a communication unit 103, a display unit 104, an operation unit 105, a storage unit 106, an audio processing unit 110, a GPS receiver 113, an acceleration sensor 114, and a time-measuring unit 115, all of which are connected with one another through a bus 116. A speaker 111 and a microphone 112 are connected to the audio processing unit 110.

The control unit 101 includes a CPU and the like, and is one example of a control means for controlling each unit of the mobile terminal 100. The control unit 101 also controls the operation of the terminal usage-state detector 121, the indoor/outdoor detection unit 122, and the search request unit 124, a user setting unit 125 (to be described later), the tag determination unit 126, the tag comparison unit 127, the content extraction unit 128, and the like shown in FIG. 1. The communication unit 103 includes an RF unit, a modulation/demodulation circuit, and the like, and performs wireless communication for data communication, call communication or the like with a base station (not shown) via the antenna 102.

The display unit 104 is one example of a display means, and includes a display device, such as an LCD, for displaying information on the display screen, and a control circuit therefor.

The operation unit 105 is one example of an input means, and may include various keys and that accepts instructions by a user and input of data. The operation unit 105 may further include, in addition to or in place of the keys, a pointing device. For example, it is also possible to use a transparent touch panel that overlaps the display screen, a mouse, a track ball, and the like.

The storage unit 106 includes memory, such as a ROM, a RAM, and the like, and stores an OS, programs such as various applications, which are executed by the CPU, and various data.

The audio processing unit 110 includes an audio encoder/decoder, a DA converter, an AD converter, and the like, and performs audio output from the speaker 111 (including earphone) and audio input from a microphone.

The GPS receiver 113 is as described above. The acceleration sensor 114 in the present embodiment is a device that detects accelerations in three-axis directions intersecting at right angles to one another. On the basis of this output, it is possible to detect the movement of the mobile terminal 100 and consequently the movement speed thereof.

In addition, although not shown in the figure, the mobile terminal 100 includes a power-supply unit, a music reproduction unit, a video reproduction unit, and the like. The mobile terminal 100 may further include a camera unit, a short-distance wireless communication unit, a non-contact IC card function unit, an external memory interface, and the like.

FIG. 3 shows an example of the content of shop data 30 regarding each service registered in a tagged service database 203 in the LBS server 200. The format thereof has a plurality of fields described below in which registration items are stored as shown in the figure.

Service name: field indicating the name of a shop, which is a service in a wide sense. In the present embodiment, shop data 30 other than an online shop and a non-online shop is provided.

Tag: name of a tag associated with a service (narrow sense) provided by the shop. One shop can have a plurality of tags in such a manner as to correspond to the various provided services.

Address: field indicating the physical place of the shop.

Telephone number: field indicating the telephone number of the shop.

Necessity of going to shop: this field is represented by "necessary" or "unnecessary" and specifies whether or not it is necessary for a customer to go to the shop of the address in order to use a specific service provided at that shop.

Business hours: field indicating a time period during which the shop is in business.

Web address (URL): field indicating the address of the home page of the shop. The shop may have a Web page (content) that provides only the information regarding services depending on the shop. In that case, it is necessary for the customer to go to the shop of the address in order to use a desired service. "Necessity of going to shop" in this case is set to "necessary".

GPS coordinates (position): field indicating the coordinates of the latitude and the longitude corresponding to the address. These coordinates can be automatically input by a map search application when an address is input at the time of service registration.

These fields are only examples, and can be further added or deleted as necessary.

FIGS. 4A to 4E show five specific registration examples of the shop data 30. Regarding the business hours, for example, in the case of a 24 hour business, "24 hour business" is described in the field thereof, and in the case where the business hours are not available, the field may be set as N/A. Regarding the Web address (URL), in a case where there is no web address, "none" is written in the field thereof, alternatively, the field may be set as a blank.

Figure 5:
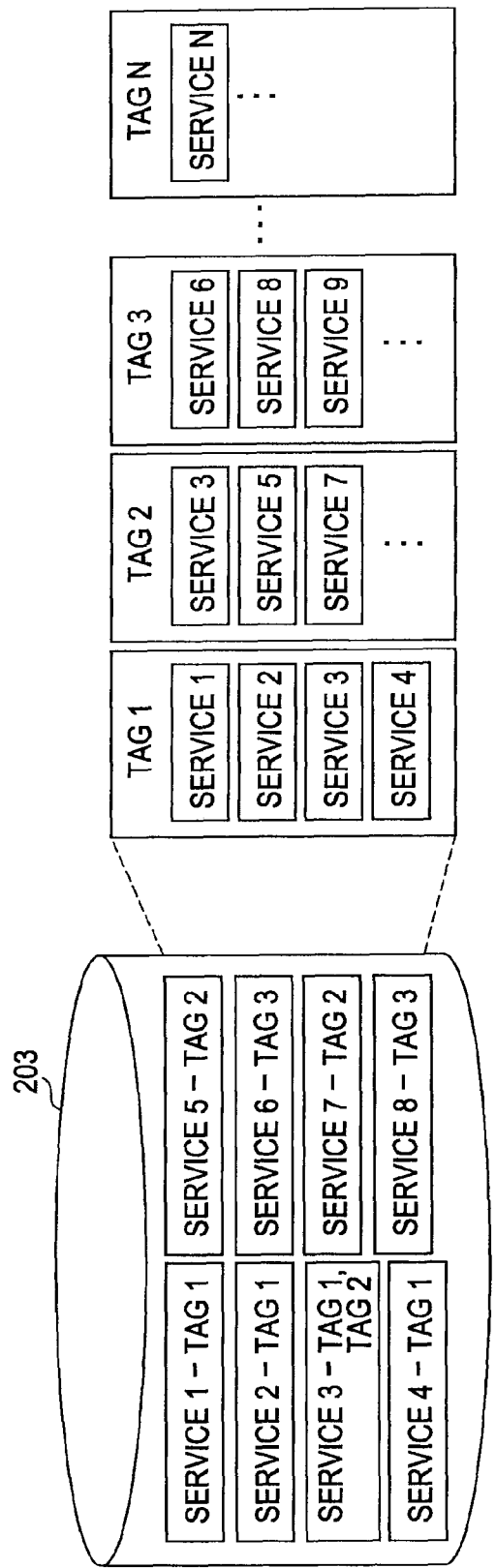
FIG. 5 illustrates an outline example of content of a tagged service database according to an embodiment of the present invention.

FIG. 5 shows an overview of an example of the content of the tagged service database 203. A plurality of tagged services are registered in the tagged service database 203. Each tagged service is a service in a wide sense as described above, and corresponds to the shop data 30 of many shops such as those described in FIG. 3 and FIGS. 4A to 4E. As shown on the right side of FIG. 5, these registered tagged services can be classified for each common tag and recognized.

FIG. 6 shows services belonging to a common tag, which are further classified on the basis of "necessity of going to shop". FIG. 7 shows an example of shops shown in FIGS. 4A to 4E, which are related to specific examples of tags. Examples of tags include "sports", "baseball", "soccer", "boxing", "Karate", "diving", "surfing", "convenience store", "foods", and the like. As can be understood from "sports", "baseball", and the like, separate tags can be provided in such a manner that the classification of the high-order concept and the classification of the low-order concept overlap each other.

Furthermore, it can be seen that even the same service name (shop) can correspond to different tags. For example, the service name "marine sports . . . " belongs to each tag of "sports", "diving", and "surfing".

Next, referring to FIG. 8, a modification of the system of FIG. 1 will be described. Components identical to components shown in FIG. 1 are designated with the same reference numerals, and repeated description thereof is omitted.

In FIG. 8, the user setting unit 125 is additionally provided in the mobile terminal 100. This user setting unit 125 is one example of a customizing means, and allows a user to customize the correspondence of situations versus tags of the context versus tag association information 123. As a result, when recommended services are to be extracted from among the tagged services obtained as a result of the search of the LBS server, it is possible to reflect the preferences of the user in the extraction (filtering) of the recommended services. As a result, recommended services suitable for individual users are output.

Figure 9:
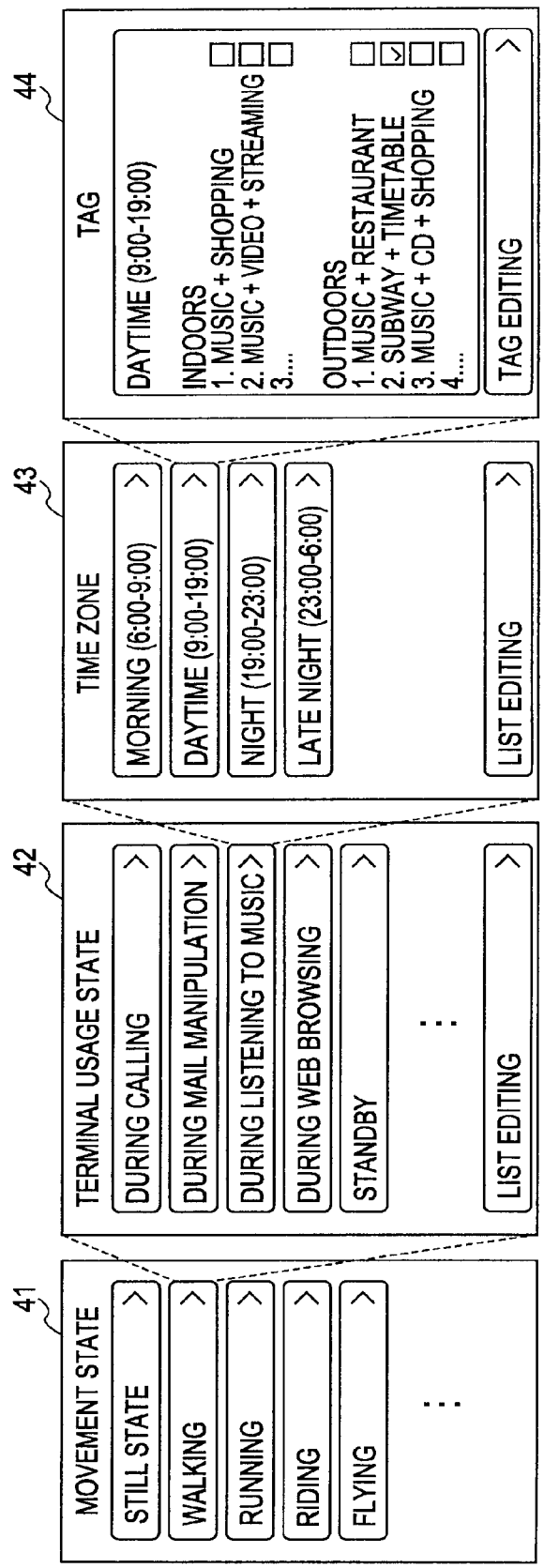
FIG. 9 illustrates an example of the transition of a screen on a mobile terminal on which a user using a mobile terminal performs a setting operation by using a user setting unit shown in FIG. 8.

FIG. 9 shows an example of the transition of a screen on a mobile terminal for the user to perform a setting operation on the mobile terminal 100 by using the user setting unit 125. In this example, a hierarchical menu structure is adopted to perform a setting as regards to the combination of many items of situation information.

When performing this user setting, first, in response to the user issuing a predetermined instruction to the mobile terminal, the mobile terminal displays a menu screen 41 at the left end of FIG. 9. This screen 41 displays a list from which the movement state (main activity) of the mobile terminal is selected. As movement states, in this example, "walking", "running", "riding", "flying", and the like are shown. By selecting one of the items in this list, it is possible to sequentially shift to screens 42 to 44 of subsequent low-order items regarding the selected item.

The screen 42 shows usage states (sub activities) of the mobile terminal in the form of a list. Here, as the usage states, "during calling", "during mail manipulation", "during listening to music", "during Web browsing", "during standby", and the like are shown. On this screen 42, as an item for editing (adding, changing, deleting, etc.) these items, a "list editing" item is provided.

The subsequent screen 43 shows a time zone in which the current time is in the form of a list. Examples of the time zone given here include morning (6:00-9:00), daytime (9:00-19:

00), night (19:00-23:00), and late night (23:00-6:00). On this screen 43, also, a "list editing" item is provided as an item from which these items are edited (added, changed, deleted, etc.).

The subsequent screen 44 shows an example of a tag assigned by the user with respect to the context (situation) that is determined by the combination of the items selected on the screens 41 to 43 up to this point. Here, separate tags can be specified between the "indoors" and the "outdoors". Furthermore, "necessity of going to shop" of each tag can be specified. In the case of "necessary", a check can be input. With regard to the tag in which this "necessary" is specified, in the process of the above-mentioned tag comparison unit 127, only the tagged service in which "necessity of going to shop" is "necessary" corresponds to the recommended service.

Depending on the selected content of the user setting, the tag of "indoors" may not be specified. For example, in a state of running or in a movement state at a speed higher than this, the user is estimated to be outdoors.

An example shown on the screen 44 will be described. For tags according to the present embodiment, the following tags can exist in addition to those described above.

Such classifications as described below, to which services which are necessary in life belong, can become tags: "music", "radio", "movie", "CD", "CD sales shop/rental shop", "video", "music-related service/facility", "game-related service/facility", "game software sales shop/rental shop", "video sales shop/rental shop", "restaurant", "music bar", "eating and drinking place", "foods shop", "coffee", "drugstore", "railway", "subway", "timetable", "shopping", "news", "newspaper", and the like.

Furthermore, it is also possible to simultaneously specify a plurality of tags that are used independently of each other (using AND condition). For example, a specification, such as "music+CD+shopping", is possible.

Furthermore, incidental information, such as "streaming" or "download", regarding a method of obtaining the information, can become a tag. Such a tag is not used independently, but is used in such a manner as to be associated with another independent tag. For example, a specification, such as "news+TV+streaming", is possible. Although not particularly shown in the figure, in order to deal with such a specification, in the tagged service, also, a service in which incidental information such as "streaming" is attached is provided.

FIG. 10 shows a specific example of the context versus tag association information 123 in the mobile terminal 100 shown in FIGS. 1 and 8. This shows the context versus tag association information 123 as a matrix table in which, for the sake of convenience, the movement state is set as a row and the usage state is set as a column.

For such context versus tag association information 123, information provided by default is used in the system shown in FIG. 1.

Conditions that are considered when the context versus tag association information 123 specified by default are to be determined are, for example, the following:

Relationship between the movement (acceleration sensor) of the mobile terminal and necessity of going to shop There is a high probability that the mobile terminal user may consider going to a neighborhood shop if he/she is moving. For example, if the user is jogging, the user may be interested in stopping by a neighborhood convenience store in order to buy a drink.

Relationship Between Time (Time Zone) and Business Hours

It is necessary for the mobile terminal user to know whether or not the shop is in business at a specific time. For example, if the current time is already 19:30 and it is necessary to purchase a snorkel for a trip tomorrow, the user will wish to go to a sports goods shop in business in the neighborhood.

Relationship Between Indoor or Outdoor; and Outdoors and Necessity of Going to Shop In a case where the customer is necessary to go to the shop of the address in order to use a service, the service is considered to be outdoors, and unless otherwise, the service is considered indoors. Examples of indoor services include an online shop.

In a case where the user is walking at a park, the user may be interested in stopping by a neighborhood Italian restaurant. In a case where the user is at home, however, it seems that the user is not interested in going out and ordering a cooking. In that case, it seems that an online service for an Italian restaurant, for example, a delivery of a pizza, is desirable.

Relationship Between Usage State of Mobile Terminal of User and Tag

A tag represents a field in which the user is interested as a mobile terminal user. For example, when the user is listening music, the user may be interested in a service to which a music-related tag is attached inside the LBS server. Alternatively, when it is recognized that the user is browsing a sports-related news, the user may be interested in a service to which a sports-related tag is attached inside the LBS server.

Relationship Between Position (GPS Receiver) and Address (Map Coordinates)

Figure 11:
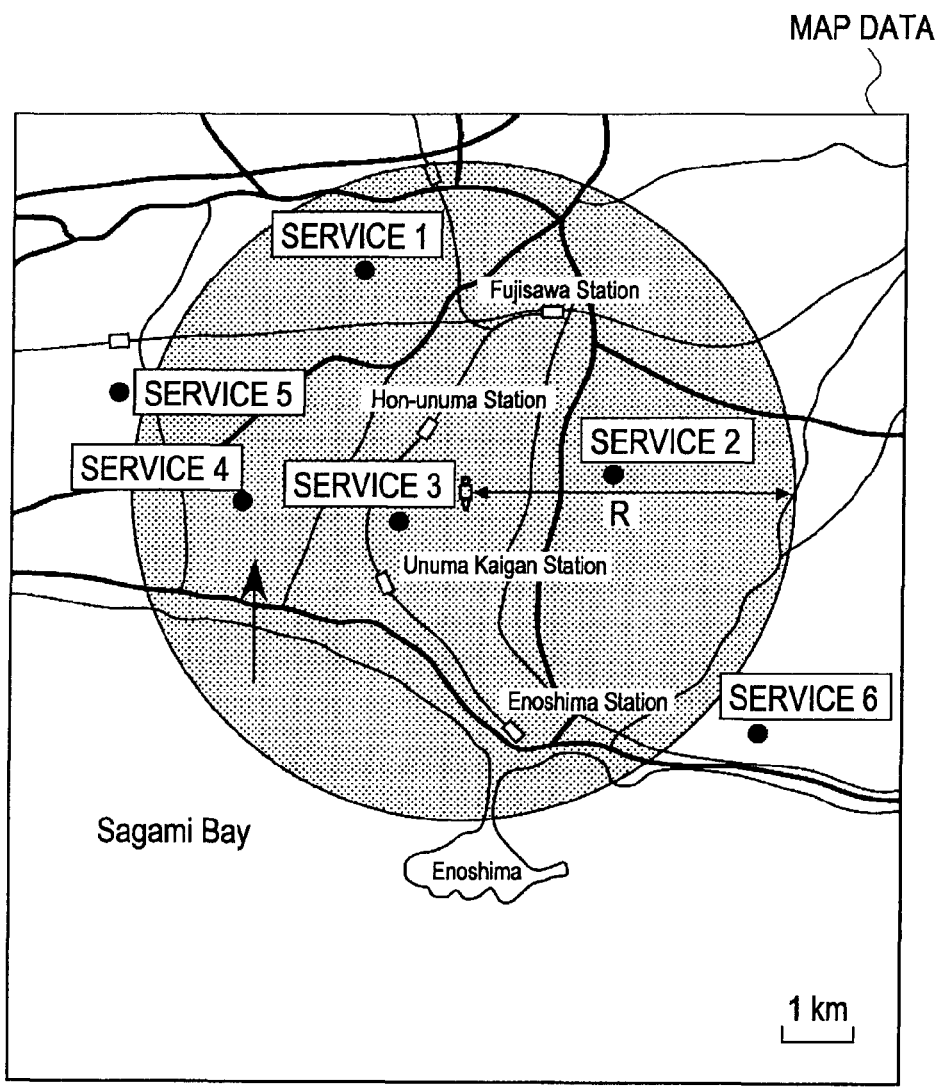
FIG. 11 is an illustration of map data according to an embodiment of the present invention.

The mobile terminal user, if possible, constantly wants to use a service closest from the current position. In order to respond to such a request, as shown in FIG. 11, map coordinates of each of recommended services (services 1 to 6, etc., in the figure) inside a database that is linked with a map database are checked. As a result, services corresponding to a range of a predetermined distance R (for example, 30 km) from the current position of the user are extracted and sent back to the mobile terminal.

It is also possible to add another service registration field other than these, which can be associated with a specific context. As a result, the search result becomes clear even more with respect to one set of contexts that can be used. In a case where the mobile terminal user sets preferences of himself/herself, it is possible to further assign the context determined by the user to a specific service registration field.

In the modification shown in FIG. 8, the function of the user setting unit 125 allows the content of the context versus tag association information 123 to be variably set on the basis of a user operation. That is, the group of tags specified on the screen 44 corresponds to one block corresponding to one row and one column of the context versus tag association information 123 of FIG. 10. FIG. 10 shows an example of tags assigned to a situation in which the movement state is a "still state" and the usage state is "during music appreciation". For example, when, at 8:00 in the morning, the user is in a still state and is listening to music by using the function of the music reproduction unit of the mobile terminal, if the user is indoors, the tag of "news+newspaper" and the tag of "news+TV+streaming" are selected. When the user is outdoors in the same situation, the tags of "coffee+restaurant (going to shop is necessary)", "subway+timetable", and "newspaper+shopping (going to shop is necessary)", and the like are selected.

It is assumed in the present embodiment that numbers attached to tags in FIG. 10 are assumed to indicate priorities. These priorities can be used when recommended services (to be described later) are displayed (presented).

FIG. 12 shows, as another specific example of the context versus tag association information 123, an example of a tag that is assigned to a situation in which the movement state is "running" and the usage state is "during music appreciation".

In this case, unlike the case of FIG. 10, it is assumed that a tag regarding "indoors" is not assigned and does not exist.

FIG. 13 shows, in a flowchart, an example of processings of the mobile terminal 100 and the LBS server 200 in the information providing system according to the present embodiment.

When the location-based service (LBS) is to be used, the mobile terminal 100 starts this process. The use of the LBS can be periodically performed from when the starting thereof is instructed by the user until the completion thereof is instructed, or during a pre-specified period. As a result, new recommended services suitable for the current position that changes as the user is moved are obtained one after another. Of course, the use of the LBS is possible while the user is in a still state. The cycle of the execution can be set as desired by the user.

Furthermore, in addition to periodically using the LBS, the LBS can also be used sporadically in accordance with an instruction from the user.

In the mobile terminal 100, when the LBS is to be used, first, the current time is confirmed (S11). This process can be performed by reading the time from the time-measuring unit 115 of the mobile terminal. However, instead of this, the current time can be obtained from the LBS server at this point in time or at a later time.

Next, the mobile terminal 100 transmits, together with the position information of the current position, a search request to the LBS server (S12). This position information can be obtained from the position detection unit (e.g., GPS receiver 113) incorporated in the mobile terminal. The area in the surroundings of the position of the user, that is, a range of a predetermined distance R from the position, is included in the position information. This data is used to search for a service in the area in the surroundings (area range). The range can also be specified from the mobile terminal 100 side. For example, in order that a predetermined distance used to determine an area in the surroundings is variably set by the mobile terminal user, the distance (the radius in a case where the area is a circle) from the current position may be specified, and the distance information, which is added to the search request, may be transmitted to the LBS server 200. This distance allows the area in the surroundings of the mobile terminal user to be determined.

This distance can be set in the mobile terminal by the user. Alternatively, this distance may be variably set in response to the movement speed of the mobile terminal on the server side. In this case, it is assumed that speed information is added to the search request (actual speed, or information indicating the current movement state or the rank of the speed) and is transmitted to the LBS server 200.

The LBS server 200 receiving the search request from the mobile terminal 100 starts a search engine 202, and searches the tagged service database 203 for tagged services that exist in the specified range of the notified position (S21). The "specified range" is a range specified by default or is a range specified by the mobile terminal 100. The LBS server 200 transmits (sends back) the tagged services obtained as a search result to the mobile terminal 100 (S22). The tagged services to be sent back are, for example, the content of the shop data 30 shown in FIG. 3. Alternatively, the information on the tagged services may be sent back together with map data (to be described later).

The mobile terminal 100 receiving the search result detects the usage state of the terminal that is being currently used by using a terminal usage-state detector 121 (S13). This usage state includes all the applications that are currently opened by the user. In a case where a plurality of applications are simultaneously opened, the application that is currently active is used as a "usage state".

Next, as described above, the mobile terminal 100 detects whether or not the mobile terminal 100 itself is indoors or outdoors by using the indoor/outdoor detection unit 122 (S14). Furthermore, on the basis of the output of the acceleration sensor 114, the mobile terminal 100 detects the movement state of the terminal (S15).

After that, the mobile terminal 100 determines a tag corresponding to the context (detection result) that has been collected up to step S15 by referring to the context versus tag association information 123 by a tag determination unit 126 (S16).

Furthermore, the mobile terminal 100 extracts tagged services to which a tag corresponding to the tag determined in step S16 is attached from among the tagged services obtained from the LBS server 200 by using a tag comparison unit 127, and outputs the tagged services as recommended services (S17). At this time, in a case where the shop of the recommended service is a "going to shop is necessary", the services are excluded from the recommended services in a case where the current time is outside the business hours of the shop.

The mobile terminal 100 displays the recommended services that are output in the manner described above on the display screen (S18). Furthermore, as described above, the mobile terminal 100 accesses the content server from the content extraction unit 128 as necessary, obtains the content corresponding to the services, and displays the content.

As for conditions under which the order of presentations is determined in a case where a plurality of recommended services exist, in the manner described above, the recommended services can be presented in the order of the priorities of the tags, which are specified in the context versus tag association information 123. Alternatively, the recommended services may be presented in the order of the closeness of the distance from the current position. These conditions can also be used together. Here, in a case where a list of a plurality of recommended services is contained in one screen, it is assumed that those services displayed on the upper side are presented earlier than those displayed on the lower side.

In a case where the number of recommended services to be displayed is too many, in order to reduce the processing load of the mobile terminal and complexity in the operation by the user, recommended services, which exceed a predetermined default upper limit number (or specified by the user), can be excluded from the display target.

The order of the steps shown in FIG. 13 may not necessarily be as shown in the figure. For example, steps S13 to S15 or steps S13 to S16 may be performed before step S12. In particular, in a case where speed information is to be added to the search request, step S13 is performed before step S12.

Figure 14:
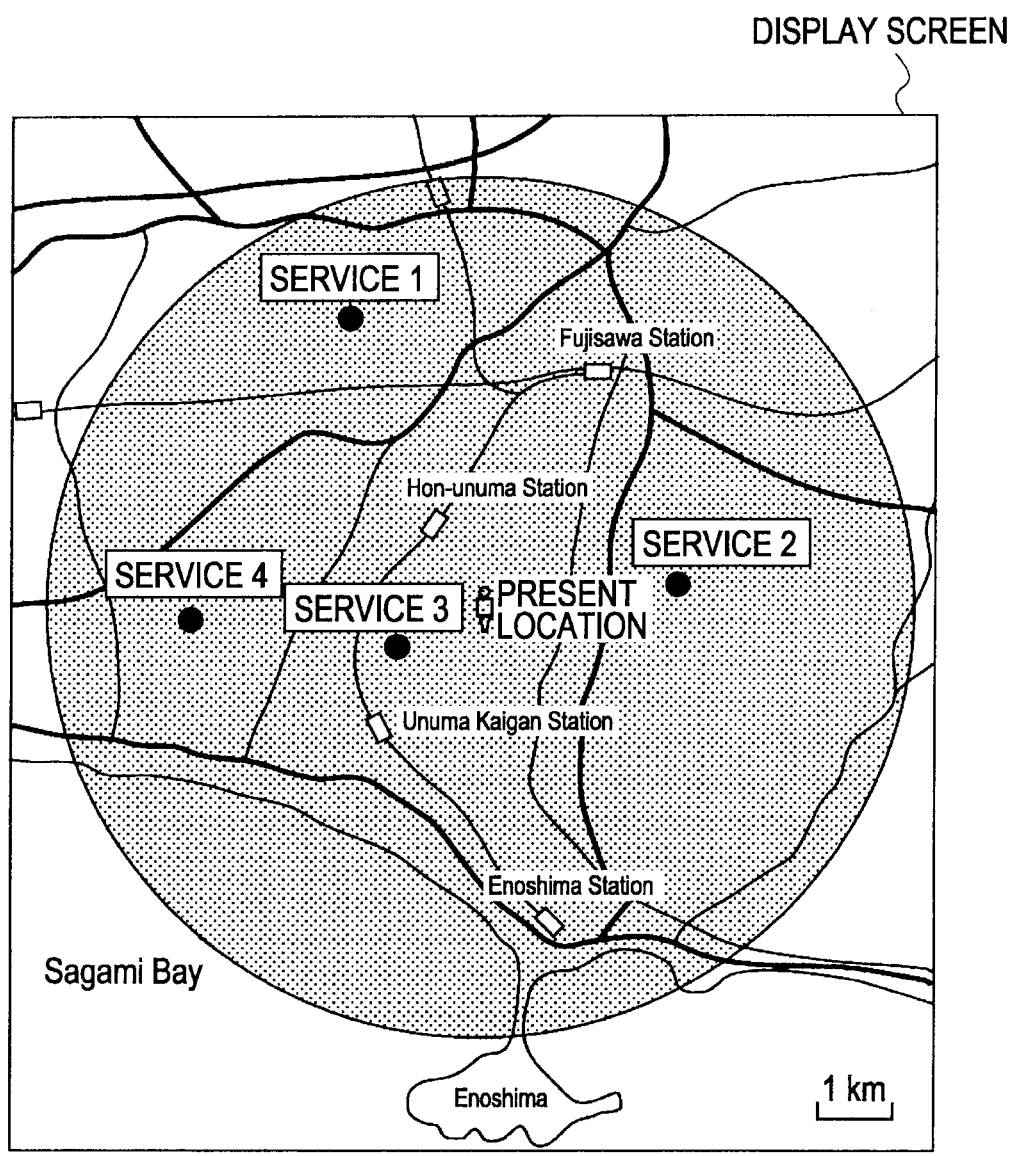
FIG. 14 illustrates an example of a display screen in a case where display is made on the display screen of the mobile terminal according to an embodiment of the present invention.

In addition to displaying the recommended services in a list display, as shown in FIG. 14, map data of an area containing a search range in which the current position is at the center can also be transmitted from the server side to the mobile terminal, so that the recommended services are displayed on the display screen of the mobile terminal. If the map data is transmitted as Web page data containing image information provided on the server side to the mobile terminal 100, map display can be performed by using the Web browsing function of the mobile terminal 100. Furthermore, in this case, it is easy to set a so-called link (anchor point) at the places of the recommended services. Of course, instead of the Web browsing function, the mobile terminal 100 may be provided with a dedicated map display application.

FIG. 14 corresponds to the above-described example of the map of FIG. 11. On the map, a predetermined mark and service identification information are displayed at the places corresponding to the recommended services. On this display screen, it is not necessarily necessary that a circle indicating the search range is displayed. Preferably, when the user indicates a mark or a character string at places indicated as recommended services by using a touch device or a pointing device, the information on the recommended services is displayed.

According to the above-described embodiment, furthermore, the mobile terminal extracts recommended services on the basis of the current situation from the tagged services obtained in the LBS server 200 on the basis of the current position of the mobile terminal 100. As a result, on the basis of the current situation of the mobile terminal user rather than on the basis of the past data and the learned information, location-based service information corresponding to a more specific classification of services is obtained. Furthermore, the past data may not be stored. The configuration in which filtering of extracting recommended services from the tagged services obtained by the LBS server 200 is performed by the mobile terminal can be realized with a comparatively small change, such as addition of a tag to a service with regard to the LBS server. Furthermore, because recent portable telephone terminals provided with a GPS function and an acceleration sensor have been distributed, such filtering can be performed by only the addition of a software process with regard to such mobile terminals.

Figure 15:
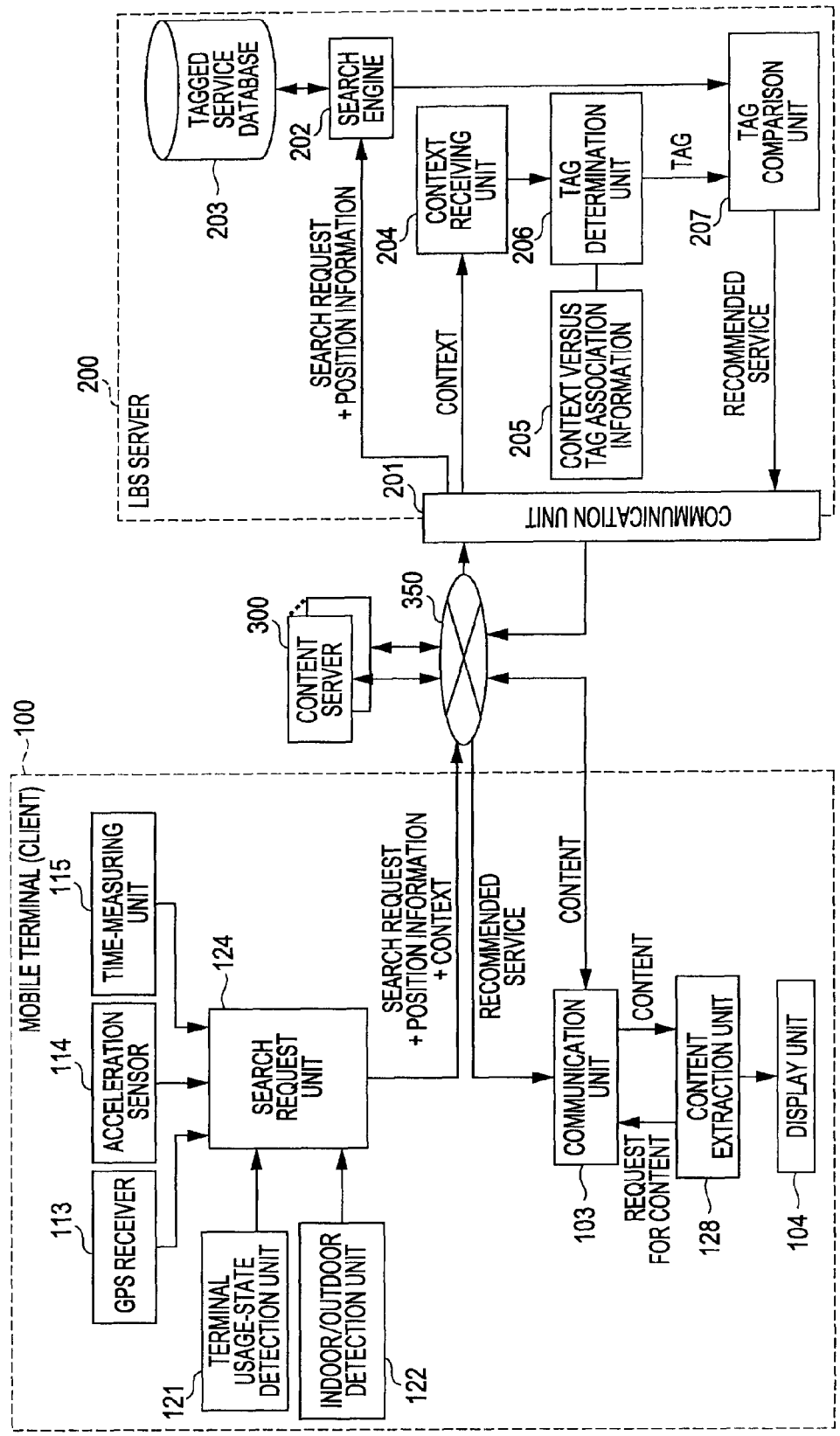
FIG. 15 illustrates an example of the configuration of an information providing system according to a second embodiment of the present invention.

Next, FIG. 15 shows an example of the configuration of an information providing system according to a second embodiment of the present invention. Components in FIG. 15, which are identical to those of the information providing system shown in FIG. 1, are designated with the same reference numerals, and repeated description thereof is omitted.

In the system of FIG. 1, filtering of extracting recommended services from the tagged services obtained in the LBS server 200 on the basis of the current position of the mobile terminal 100 is performed by the mobile terminal. In contrast, in the system of FIG. 15, the same filtering is performed in an LBS server 200. For this purpose, the context versus tag association information 123, the tag determination unit 126 and the tag comparison unit 127 in the mobile terminal 100 are deleted, and context versus tag association information 205, a tag determination unit 206, and a tag comparison unit 207 are added to the LBS server 200.

In this configuration, the search request unit 124 of the mobile terminal 100 transmits position information and context (situation information) together with a search request to the LBS server 200. In response to this search request, the LBS server 200 performs a process for searching the tagged service database 203 on the basis of the position information. The LBS server 200 causes the tag determination unit 206 to determine a tag on the basis of context. This determined tag is compared with the tagged service that is the search result by the tag comparison unit 207, and recommended services are extracted. These recommended services are transmitted to the mobile terminal 100 by the communication unit 201. The other processes are the same as those of FIG. 1. In this embodiment, tag information may not be contained in the recommended services that are transmitted to the mobile terminal 100.

According to the second embodiment, since a filtering process is performed on the LBS server 200 side, the processing load in the mobile terminal 100 is reduced. Furthermore, it is not necessary to transmit many tagged services more than necessary from the LBS server 200 to the mobile terminal 100. Consequently, the amount of communication data is reduced, and the communication time is shortened. It is necessary for the mobile terminal 100 to transmit many contexts more than in the first embodiment when a search request is made, but the amount of data is comparatively small.

Figure 16:
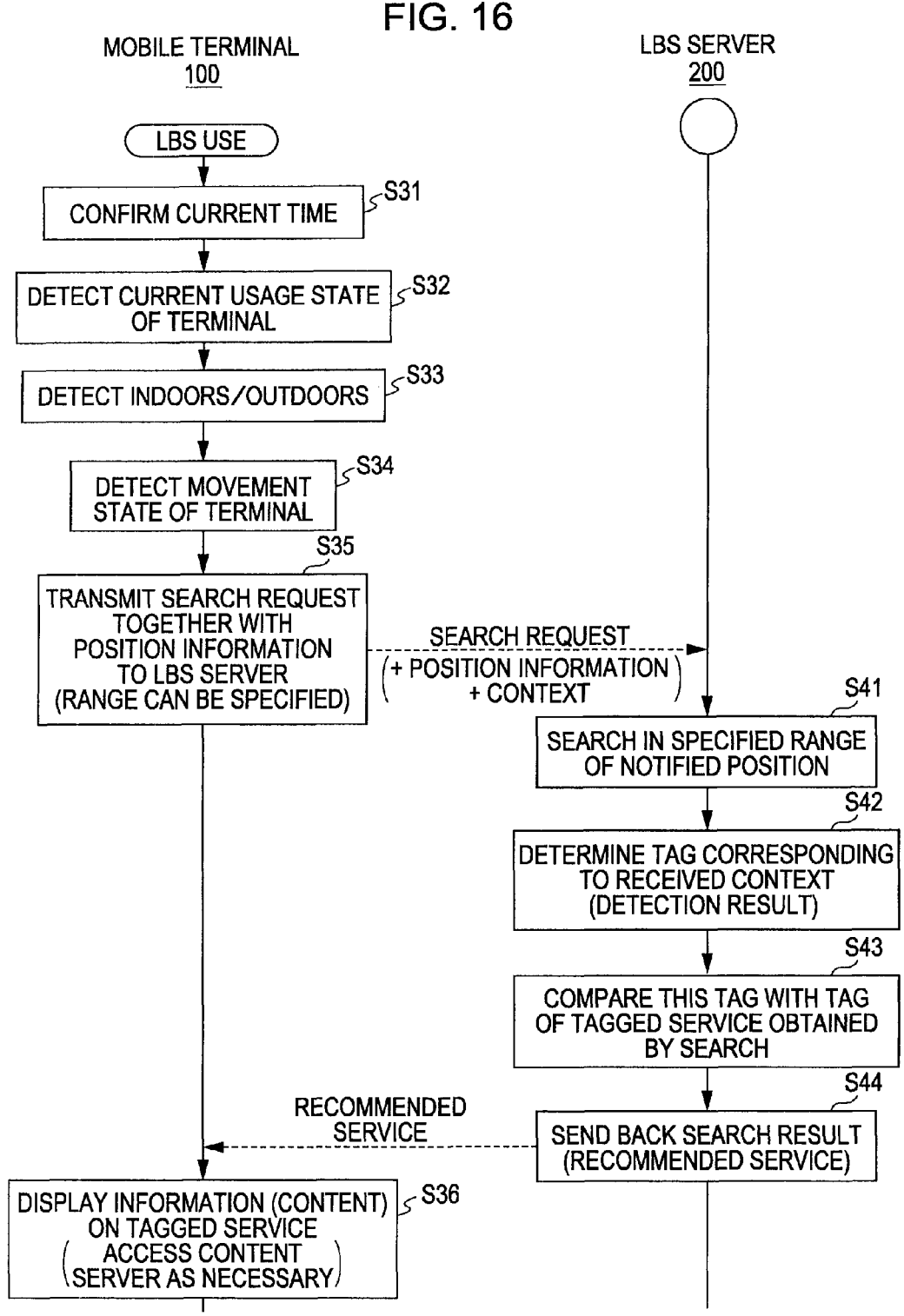
FIG. 16 is a flowchart illustrating an example of the processing of a mobile terminal and an LBS server in the information providing system according to the second embodiment of the present invention.

FIG. 16 shows, in a flowchart, an example of the processing of the mobile terminal 100 and the LBS server 200 in the information providing system according to the second embodiment.

Similarly to the first embodiment, when the location-based service (LBS) is to be used, the mobile terminal 100 starts this process.

When using the LBS, first, the mobile terminal 100 confirms the current time (S31). Next, the mobile terminal 100 detects the usage state of the terminal that is being currently used by the user by using the terminal usage-state detector 121 (S32), and detects whether the mobile terminal is indoors or outdoors by using the indoor/outdoor detection unit 122 (S33). Furthermore, the mobile terminal 100 detects the movement state of the terminal on the basis of the output of the acceleration sensor 114 (S34).

Therefore, the mobile terminal 100 transmits a search request together with the position information of the current position and the collected context to the LBS server 200 (S35). Also, in this embodiment, since a predetermined distance with which an area in the surroundings is determined is variably set by the mobile terminal user, a distance (radius when the area is set as a circle) from the current position may be specified, and the distance information may be added to the search request and transmitted to the LBS server 200.

In the LBS server 200, the search request is received from the mobile terminal 100 by the communication unit 201 of the LBS server 200, and the search engine 202 is started. The search engine 202 searches the tagged service database 203 for tagged services that exist within the specified range of the notified position (S41). Next, in the LBS server 200, with respect to the tagged services obtained as a search result, the tag determination unit 206 determines the tags corresponding to the context (detection result) received from the mobile terminal 100 by referring to the context versus tag association information 205 (S42). Furthermore, in the LBS server 200, tagged services to which the tags corresponding to the tags determined in step S42 are attached are extracted from among the tagged services obtained as a result of the search by the tag comparison unit 207, and are output as recommended services (S43). At this time, in a case where the shop of the recommended service is "going to shop is necessary", in the case that the current time is outside the business hours of the shop, the service is excluded from the recommended services. The LBS server 200 transmits (sends back) the recommended services obtained in the manner described above to the mobile terminal (S44).

The recommended services to be the sent back may be, for example, the content of the shop data 30 shown in FIG. 3 or may be sent back together with map data in the manner described above.

The mobile terminal 100 displays the received recommended services on the display screen (S36). Furthermore, as described above, access is made to the content server from the content extraction unit 128 as necessary, and the content corresponding to the services is obtained and displayed.

Also, in the present embodiment, in addition to displaying the recommended services in a list display, as shown in FIG. 14, map data of an area containing a search range in which the current position is at the center can be transmitted from the server side to the mobile terminal, and can be displayed on the display screen of the mobile terminal.

Figure 17:
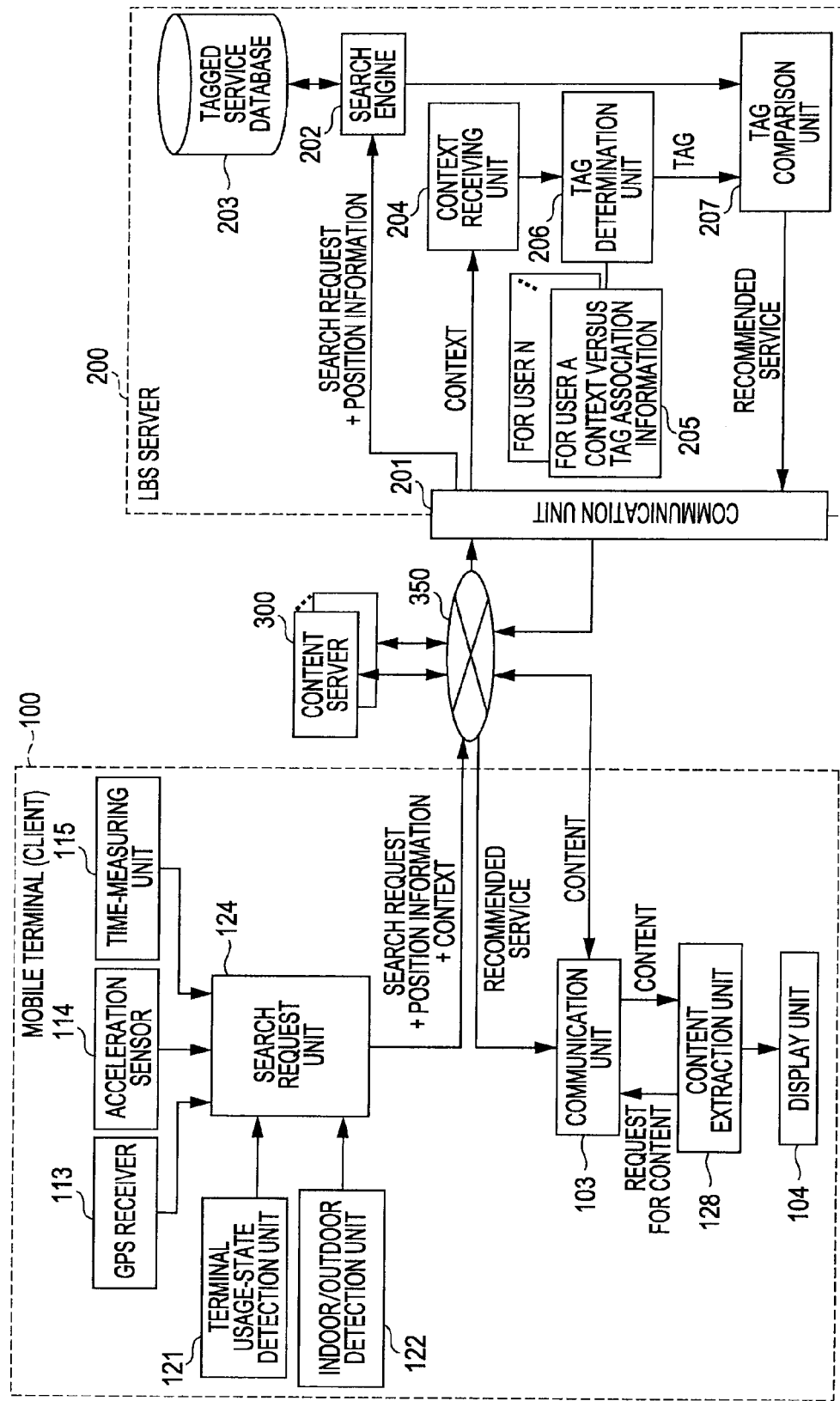
FIG. 17 illustrates a modification of the information providing system of FIG. 15.

FIG. 17 shows a modification of the information providing system of FIG. 15. Components in FIG. 17, which are identical to those components shown in FIG. 15, are designated with the same reference numerals, and repeated description thereof is omitted. In the configuration of FIG. 17, the user setting unit 125 is added to the mobile terminal 100. Furthermore, a plurality of items of context versus tag association information 205 stored on the LBS server 200 side are provided so as to correspond to the user. Furthermore, in this modification, prior to the use of the LBS server, the identification information on the user is transmitted from the mobile terminal to the LBS server 200, and the mobile terminal user is identified on the basis of this identification information.

Although the preferred embodiments of the present inventions have been described above, various modifications and changes can be made in addition to those described above. For example, types of context, the number of contexts, the classification of the movement, the classification of the terminal usage state, the classification of the time zone, and the like are only examples, and are not limited to the above-described specific examples. As elements of time, a weekday may be further added.

It should be understood by those skilled in the art that various modifications, combinations, sub-combinations and alterations may occur depending on design requirements and other factors insofar as they are within the scope of the appended claims or the equivalents thereof.

What is claimed is:

1. A mobile terminal comprising:
a position detection unit configured to detect a current position of the mobile terminal;
a communication interface configured to transmit the detected current position to a server, and to receive, from the server, a plurality of tags corresponding to services provided in an area surrounding the current position of the mobile terminal;
a status detection unit configured to detect a current status of the mobile terminal;
a tag determination unit configured to determine a tag corresponding to the current status of the mobile terminal;
a tag comparison unit configured to determine at least one recommended service by comparing the tag corresponding to the current status of the mobile terminal with each of the plurality of tags corresponding to services provided in an area surrounding the current position of the mobile terminal; and
a display configured to display information corresponding to the at least one recommended service determined by the tag comparison unit, wherein
the status detection unit includes a usage-state detection unit configured to identify an application currently being executed at the mobile terminal, and
the tag determination unit is configured to determine the tag corresponding to the current status of the mobile terminal based on the identified application currently being executed at the mobile terminal.

2. The mobile terminal according to claim 1, wherein
the status detection unit includes an indoor/outdoor detection unit configured to detect whether the mobile terminal is indoors or outdoors, and
the tag determination unit is configured to determine the tag corresponding to the current status of the mobile terminal based on a result of the detection by the indoor/outdoor detection unit.

3. The mobile terminal according to claim 1, wherein
the status detection unit includes a movement sensor configured to detect a moving state of the mobile terminal, and
the tag determination unit is configured to determine the tag corresponding to the current status of the mobile terminal based on the detected moving state of the mobile terminal.

4. The mobile terminal according to claim 3, wherein
the movement sensor is configured to detect whether the mobile terminal is currently in a still state, a walking state, a running state, a riding state or a flying state.

5. The mobile terminal according to claim 1, wherein
the status detection unit includes
a usage-state detection unit configured to identify an application currently being executed at the mobile terminal;
an indoor/outdoor detection unit configured to detect whether the mobile terminal is indoors or outdoors; and
a movement sensor configured to detect a moving state of the mobile terminal, wherein
the tag determination unit is configured to determine the tag corresponding to the current status of the mobile terminal based on the identified application currently being executed at the mobile terminal, the result of the detection by the indoor/outdoor detection unit, and the detected moving state of the mobile terminal.

6. The mobile terminal according to claim 1, wherein
the display is configured to display a map including graphic indicia corresponding to a geographic location of the at least one recommended service.

7. The mobile terminal according to claim 1, further comprising:
a user interface configured to display a hierarchal menu configured to receive a user settings identifying a priority and a relationship between each of a plurality of different categories of status information corresponding to the mobile terminal, wherein
the tag determination unit is configured to determine the tag based on the user settings.

8. A non-transitory computer-readable medium including computer program instructions, which when executed by a mobile terminal, cause the mobile terminal to perform a method comprising:
detecting a current position of the mobile terminal;
transmitting the detected current position to a server;
receiving, from the server, a plurality of tags corresponding to services provided in an area surrounding the current position of the mobile terminal;
detecting a current status of the mobile terminal;
determining a tag corresponding to the current status of the mobile terminal;
determining at least one recommended service by comparing the tag corresponding to the current status of the mobile terminal with each of the plurality of tags corresponding to services provided in an area surrounding the current position of the mobile terminal; and
displaying information corresponding to the at least one recommended service determined by the tag comparing, wherein
detecting a current status of the mobile terminal includes identifying an application currently being executed at the mobile terminal, and
the tag corresponding to the current status of the mobile terminal is determined based on the identified application currently being executed at the mobile terminal.

9. The non-transitory computer readable medium according to claim 8, wherein
  detecting a current status of the mobile terminal includes detecting whether the mobile terminal is indoors or outdoors, and
  the tag corresponding to the current status of the mobile terminal is determined based on a result of the detection that the mobile terminal is indoors or outdoors.

10. The non-transitory computer readable medium according to claim 8, wherein
  detecting a current status of the mobile terminal includes detecting a moving state of the mobile terminal, and
  the tag corresponding to the current status of the mobile terminal is determined based on the detected moving state of the mobile terminal.

11. The mobile terminal according to claim 10, wherein
  detecting a moving state of the mobile terminal included detecting whether the mobile terminal is currently in a still state, a walking state, a running state, a riding state or a flying state.

12. The non-transitory computer readable medium according to claim 8, wherein
  detecting a current status of the mobile terminal includes
    identifying an application currently being executed at the mobile terminal;
    detecting whether the mobile terminal is indoors or outdoors; and
    detecting a moving state of the mobile terminal, wherein
  the tag corresponding to the current status of the mobile terminal is determined based on the identified application currently being executed at the mobile terminal, the result of the detection that the mobile terminal is indoors or outdoors, and the detected moving state of the mobile terminal.

13. The non-transitory computer readable medium according to claim 8, wherein
  the displaying includes displaying a map including graphic indicia corresponding to a geographic location of the at least one recommended service.

14. The non-transitory computer readable medium according to claim 8, further comprising:
  receiving a user settings identifying a priority and a relationship between each of a plurality of different categories of status information corresponding to the mobile terminal, wherein
    the tag corresponding to the current status of the mobile terminal is determined based on the user settings.

15. A mobile terminal comprising:
  means for detecting a current position of the mobile terminal;
  means for transmitting the detected current position to a server;
  means for receiving, from the server, a plurality of tags corresponding to services provided in an area surrounding the current position of the mobile terminal;
  means for detecting a current status of the mobile terminal;
  means for determining a tag corresponding to the current status of the mobile terminal;
  means for determining at least one recommended service by comparing the tag corresponding to the current status of the mobile terminal with each of the plurality of tags corresponding to services provided in an area surrounding the current position of the mobile terminal; and
  means for displaying information corresponding to the at least one recommended service determined by the means for determining at least one recommended service wherein
  the means for detecting identifies an application currently being executed at the mobile terminal, and
  the means for determining a tag corresponding to the current status of the mobile terminal identifies the tag based on the identified application currently being executed at the mobile terminal.

16. The mobile terminal according to claim 15, wherein
  the means for detecting detects whether the mobile terminal is indoors or outdoors, and
  the means for determining a tag corresponding to the current status of the mobile terminal identifies the tag based on a result of the detection that the mobile terminal is indoors or outdoors.

17. The mobile terminal according to claim 15, wherein
  the means for detecting detects a moving state of the mobile terminal, and
  the means for determining a tag corresponding to the current status of the mobile terminal identifies the tag based on the detected moving state of the mobile terminal.

* * * * *